United States Patent [19]

Wonn

[11] 3,901,030

[45] Aug. 29, 1975

[54] TORQUE CONVERTER WITH A CONTROLLED STATOR FOR LIMITING THE TORQUE RATIO

[75] Inventor: Quinby E. Wonn, Plymouth, Mich.

[73] Assignee: General Motors Corporation, Detroit, Mich.

[22] Filed: June 5, 1974

[21] Appl. No.: 476,692

[52] U.S. Cl. ..................... 60/341; 60/343; 60/361; 60/364
[51] Int. Cl.² ........................................ F16D 33/00
[58] Field of Search ............ 60/341, 342, 343, 361, 60/364, 367, 357, 360

[56] References Cited
UNITED STATES PATENTS 3,180,095   4/1965   Schneider ............................ 60/343

*Primary Examiner*—Edgar W. Geoghegan
*Attorney, Agent, or Firm*—Donald F. Scherer

[57] ABSTRACT

A torque converter in which a controller stator is utilized to limit the torque delivered by the converter. The stator is controlled by a friction brake which is designed to have a limited capacity. When the stator torque is higher than the design capacity, the stator will rotate in a direction opposite to the impeller to limit the maximum torque ratio of the converter. The stator is also controlled during coast to provide churn braking.

4 Claims, 3 Drawing Figures

TORQUE CONVERTER WITH A CONTROLLED STATOR FOR LIMITING THE TORQUE RATIO

This invention relates to torque converters and more particularly to torque converters having a controlled stator for limiting the maximum torque ratio.

The present invention is useful with both internal combustion engines and gas turbine engines where it is desirable to limit the torque transmitted from the engine to the transmission gearing. In the prior art transmissions, the torque transmitted is limited only by the stall capacity of the torque converter which is drivingly connected between the engine and the planetary gearing. Also, in the prior art arrangements, the maximum torque ratio of the torque converter is achieved only during the stall conditions. Once the torque converter turbine begins to rotate, the torque ratio decreases and therefore the torque output of the converter decreases.

The present invention permits the torque converter to transmit maximum torque at stall and during a predetermined speed ratio range of the converter. This is accomplished by permitting the stator to rotate in a direction opposite to impeller rotation. The stator rotation is controlled by a friction device such that when a predetermined torque reaction is present at the stator, the stator will begin rotating. Since the torque output of the turbine is the summation of the absolute values of the impeller torque and the stator reaction torque, the turbine output is thus controlled. The speed ratio of the torque converter is determined by dividing the turbine speed by impeller speed.

The torque converter utilizing the present invention can also provide a braking function for the drive system. During coast operation, it is possible to engage the friction device associated with the stator to control rotation of the stator and thereby create fluid forces within the torque converter which have braking effect on the transmission. This is particularly useful with gas turbine type engines where engine braking is reduced due to the engine inertia.

It is an object of this invention to provide an improved torque converter having a stator which is selectively controlled by a friction brake to limit the torque transmission.

It is another object of this invention to provide in an improved torque converter a friction brake which is selectively operable during driving to control the stator rotation and thereby the torque ratio of the converter below a predetermined speed ratio therein and which brake is also selectively engageable during coasting to provide churn brake action in the converter.

These and other objects and advantages of the invention will be more apparent from the following description and drawings wherein.

Figure 1:
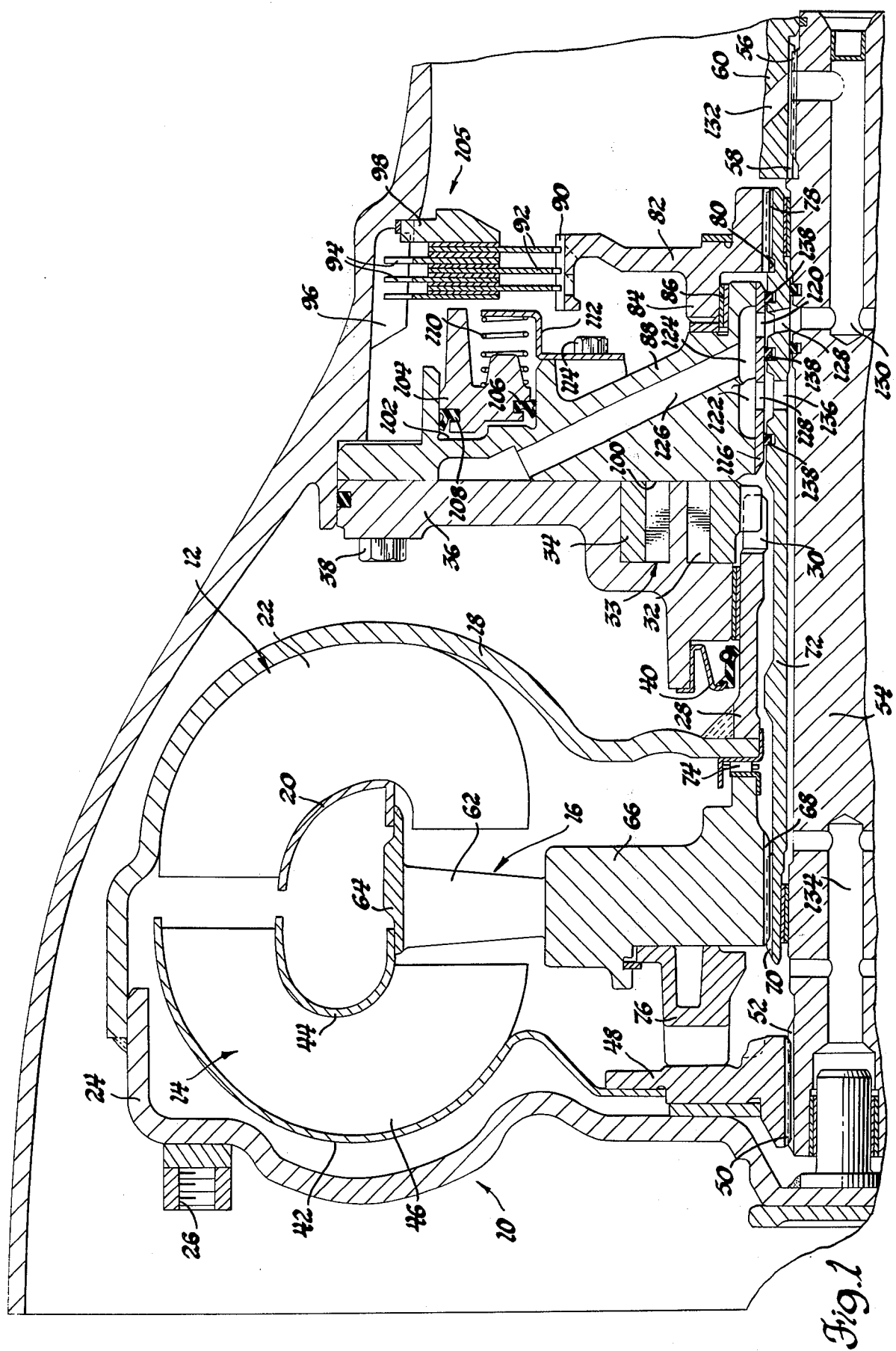
FIG. 1 is a cross sectional elevational view of a torque converter utilizing a fixed angle stator.

Referring to the drawings and particularly FIG. 1 there is shown a torque converter 10 having an impeller 12, a turbine 14, and a stator 16. The impeller 12 has an outer shell 18 and an inner shell 20 between which are positioned a plurality of blade elements such as 22. The outer shell 18 is welded or otherwise secured to an end cover 24 which has secured thereto a plurality of threaded fasteners such as 26. The fasteners 26 are adapted to permit the end cover 24 and therefore the turbine 12 to be coupled to an engine not shown. A pump shaft 28 is secured to the shell 18 at its inner diameter and has formed thereon a drive slot 30 which is adapted to drive the internal gear 32 of a conventional internal-external type gear pump 33. The gear pump 33 also includes an external gear 34 which gears 32 and 34 are contained in a pump housing 36 which is secured to the transmission housing by a plurality of threaded fasteners such as 38. A conventional lip seal 40 is secured in the pump housing 36 and sealingly engages the pump shaft 28 to prevent fluid leakage from the gear pump to the space in the transmission case containing the torque converter 10.

The turbine 14 includes an outer shell 42 and an inner shell 44 between which are contained a plurality of blades such as 46. The outer shell 42 is secured to a turbine hub 48 which has a splined portion 50 drivingly engaged with a spline 52 formed on one end of a torque converter output shaft 54. The torque converter output shaft 54 also has, at the other end, a splined portion 56 which is drivingly connected to a spline 58 formed on a hub 60. The hub 60 forms a portion of a planetary gearing assembly, not shown, which gearing may be constructed in accordance with U.S. Pat. No. 3,321,056.

The stator 16 has a plurality of vane members such as 62 which are integrally formed with an outer core 64 and an inner hub 66. The inner hub 66 has formed thereon a spline 68 which is drivingly connected with a spline 70 formed on one end of a stator sleeve shaft 72. The hub 66 is separated from the shell 18 by a conventional roller bearing 74, and from the turbine hub 48 by a thrust washer assembly 76. The other end of the stator sleeve shaft 72 also has a spline 78 which is drivingly connected to a spline 80 formed on a brake hub 82. The brake hub 82 has an annular portion 84 which is rotatably supported on a bearing 86 secured to a stationary housing 88. The brake hub 82 also has a spline portion 90 to which are splined a plurality of friction discs 92. Alternately spaced of the friction discs 92 are a plurality of friction discs 94 which are drivingly connected to the transmission case through a spline 96. A backup plate 98 is also splined through the transmission case.

The housing 88 is secured to the transmission case by the fasteners 38 and includes a surface 100 which closes one side of the gear pump 33. The housing 88 also has an annular chamber 102 in which is slidably disposed an annular piston 104 having inner and outer seals 106 and 108, respectively, positioned thereon. The seals 106 and 108 sealingly engage the annular chamber 102 to prevent fluid leakage from the chamber 102. A plurality of compression springs such as 110 are compressed between a retainer plate 112 and the piston 104. The retainer plate 112 is secured to the housing 88 by a plurality of fasteners such as 114. When the chamber 102 is not pressurized, the springs 110 will move the piston 104 to the position shown. When the chamber 102 is pressurized, the piston 104 will move to the right thereby providing a frictional engagement between the friction discs 92 and 94 such that a braking action or speed retarding action is provided for the stator 16. The discs 92 and 94, backup plate 98, piston 104, chamber 102, and springs 110 cooperate to provide a selectively operable friction brake, designated 105.

The inner diameter of the housing 88 is sealed by a sleeve 116 in which are formed apertures 118 and 120. The aperture 118 is in fluid communication with a recess 122 formed in the housing 88 and the aperture 120 is in fluid communication with a recess 124 and passage 126 formed in the housing 88. The passage 124 supplies fluid pressure from the transmission control system, such as that shown in U.S. Pat. No. 3,321,056, to one of the transmission clutches. Fluid is directed from chamber 124 through opening 120, and opening 128 formed in shaft 72 and passages 130 formed in shaft 54 with passage 132 formed in the housing 60. The recess area 122 is in fluid communication with the transmission sump to permit fluid flowing from the torque converter 10 to return to the transmission sump via passages 134 formed in the shaft 54 and opening 136 formed in shaft 72. Fluid communication between the openings 128 and 136 is prevented by a plurality of seals 138 disposed in grooves formed in the stator shaft 72.

Figure 2:
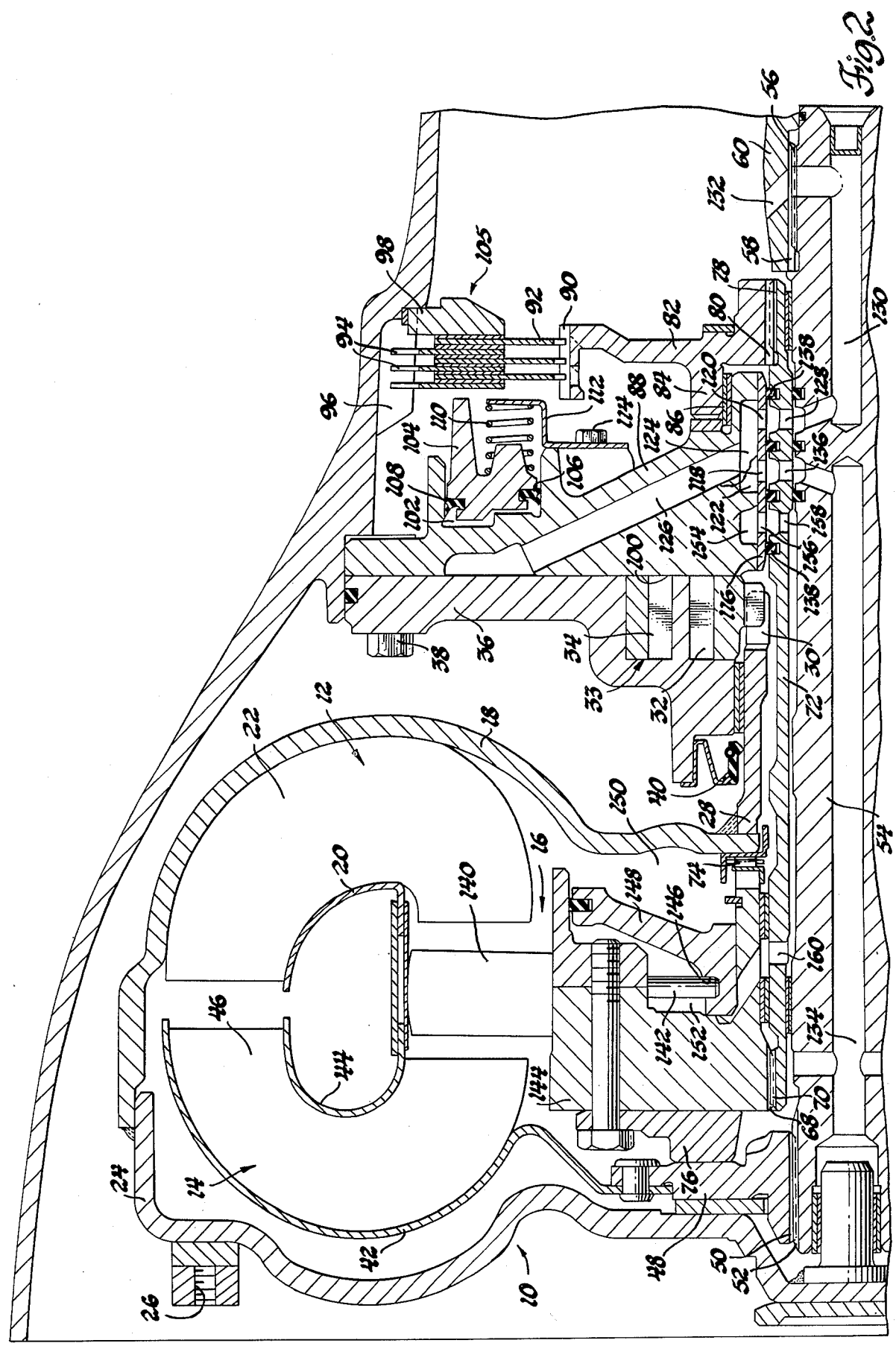
FIG. 2 is a cross sectional elevational view of a torque converter utilizing a variable angle stator.

The torque converter shown in FIG. 2 has substantially the same construction as the torque converter shown in FIG. 1 with the exception that a variable angle stator is provided. In the interest of brevity, the description of the torque converter in FIG. 2 will be limited to the structure found therein which is different from FIG. 1, and the remaining structure will be given the same numerical designation as the corresponding components described above for FIG. 1 without further description here. The stator 16 includes a plurality of vanes 140 which are secured to crank arms 142 pivotally mounted in a two piece hub 144. The crank arms 142 are slidably disposed in a groove 146 formed in a piston 148 which piston is slidably disposed in the hub 144. The piston 148 is axially movable in the stator hub 144 to establish high and low angles for the stator vanes 140 in a well known manner. The position of the piston 148 is controlled by charge pressure to the torque converter in the area 150 and control pressure in the chamber 152 formed between the piston 148 and the stator hub 144. The variable stator can be controlled by any of the well known stator controls such as those shown in U.S. Pat. Nos. 3,159,052 and 3,425,220. Fluid pressure for control chamber 152 is directed from a recess 154 formed in the housing 88 through an opening 156 formed in the sleeve 116, an opening 158 formed in the stator shaft 72 and another opening 160 formed in the stator shaft 72. Other than the stator described above the torque converter 10 shown in FIG. 2 is of the same construction as the torque converter 10 shown in FIG. 1.

The use of the variable angle stator shown in FIG. 2 permits the torque converter to be normally used with a transmission control having a variable charge pressure system for the torque converter. It is the primary purpose of this invention to limit the torque multiplication of the torque converter. The torque multiplication of the torque converter is, among other factors, a function of the charge pressure. Thus, with an increase in converter charge pressure there is increased torque multiplication due to the added torque capacity of the impeller. To maintain the torque ratio below a predetermined value it therefore becomes desirable to adjust the stator blade angle to the increased impeller capacity. The variable stator shown in FIG. 2 permits such operation.

Figure 3:
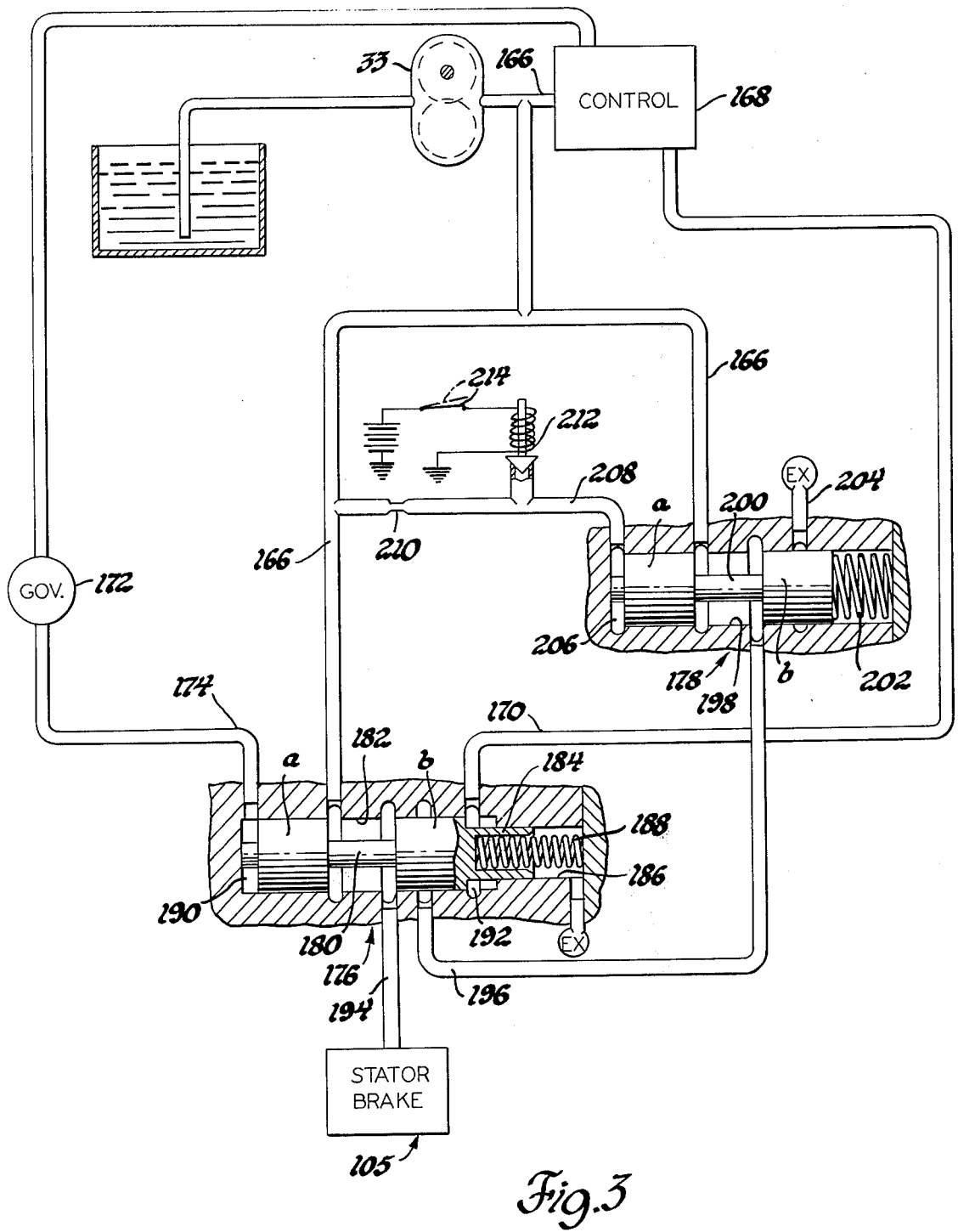
FIG. 3 is a diagrammatic representation of a fluid system for controlling the stator brake.

The control valving shown in FIG. 3 is used to control the engagement and disengagement of the stator brake 105. The control shown in FIG. 3 includes the conventional internal-external gear pump 33 which delivers fluid pressure through a passage 166 to a transmission control system 168. The control 168 may be constructed in accordance with U.S. Pat. No. 3,321,056. This control includes a conventional modulator or torque demand pressure regulator which delivers fluid pressure via passage 170. The conventional control system also includes a governor 172 which may be constructed in accordance with U.S. Pat. No. 2,762,384. As is well known, the governor is driven by the transmission output shaft to provide a pressure in passage 174 which is proportional to vehicle speed. The pressure in passage 166 is controlled by the conventional regulator valve not shown. The fluid pressure in passage 166 is directed to a stator brake control valve 176 and to a coast control valve 178.

The stator brake valve 176 includes a valve spool 180 having equal diameter spaced lands a and b slidably disposed in a valve bore 182, a spring seat 184 slidably disposed in a bore 186 and a compression spring 188 compressed between the spring seat 184 and the end of bore 186. The bore 182 and valve land a cooperate to form a governor chamber 190 which is in fluid communication with the governor passage 174, and the valve land b, spring seat 184, and bore 182 cooperate to form a modulator pressure chamber 192 which is in fluid communication with the modulator passage 170. The valve bore 182 is also in fluid communication with the passage 166, a brake apply passage 194, and a control passage 196. In the spring set position shown, the stator brake valve 176 is positioned to direct line pressure between lands a and b to passage 194 which is connected to chamber 102 of brake 105 shown in FIGS. 1 and 2. In this position the stator brake piston 104 is applied to provide a grounding reaction for the stator 16. When the brake is thus applied the reaction of the stator 16 is controlled. The amount of the reaction torque that the stator 16 can absorb is determined by the brake apply pressure, the number of friction discs 92 and 94 employed, the mean radius of the friction discs, and the coefficient of the friction disc. By controlling these parameters the reaction force in the stator 16 is controlled and therefore the torque multiplication of the torque converter 10 is controlled. For example it is desirable to limit the output torque of the converter at 600 foot pounds when the input torque is 300 foot pounds, the brake discs 92 and 94 are designed to slip when the stator reaction torque is 300 foot pounds. It is also desirable to permit the stator 16 to free wheel when the torque converter 10 approaches the coupling phase. To provide free wheel of the stator, the control valve 176 is responsive to vehicle speed and engine torque such that at a predetermined combination of these parameters, at approximately 0.85 speed ratio in the converter, the valve spool 180 will be shifted to the right against spring 188 thereby blocking passage 166 with valve land a while providing fluid communication between passages 194 and 196 to provide controlled exhausting of the brake 105 which will be explained below.

The passage 196 is in fluid communication with a valve bore 198 of the coast control valve 178. The coast control valve 178 also includes a valve spool 200 having equal diameter spaced lands *a* and *b* which are slidably disposed in the valve bore 198.

A compression spring 202 is compressed between valve land b and one end of valve bore 198 to urge the valve spool 200 to the spring set position shown. The valve bore 198 is also in fluid communication with passage 166 and an exhaust passage 204. The valve land *a* and valve bore 198 cooperate to form a control chamber 206 which is in fluid communication with a passage 208. The passage 208 is in fluid communication with passage 166 through a restriction 210. The fluid pressure in passage 208 is controlled by a normally closed solenoid valve 212 which is of conventional design and may be similar to the solenoid valves used in automatic transmissions to control forced downshifts. The solenoid valve 212 is controlled by a conventional electrical switch 214 which is controlled by the vehicle throttle pedal, not shown, such that at the idle or closed throttle position the switch 214 is closed. When the switch 214 is closed the solenoid valve 212 is energized thereby permitting fluid pressure in passage 208 and 206 to be exhausted such that the valve spool 200 will be moved to the spring set position shown. When the throttle pedal is moved from idle by the operator, the switch 214 will open thereby deenergizing and closing solenoid valve 212 so that pressure will develop in passage 208 and chamber 206. Fluid pressure in chamber 206 will cause the valve spool 200 to move to the right against spring 202 such that valve land *a* will block passage 166 while fluid communication is provided between passage 196 and exhaust passage 204. Thus, under normal operating conditions, when the valve spool 180 is shifted, the passage 196 will be connected to exhaust 204 such that the stator brake 105 will be disengaged when the valve 176 is in the shifted position. However, if the operator should permit the throttle to return to idle while the valve spool 180 of valve 176 is in the shifted position, the valve spool 200 will return to the spring set position shown so that fluid pressure in passage 166 is delivered to passage 196 through valve 178, from which passage 196 fluid pressure is delivered through passage 194 to valve 196 to engage the stator brake 105. During vehicle coast with the stator brake 105 engaged, a churning or hydrodynamic braking takes place in the converter 10 to assist the engine braking normally available. Thus, added coast braking is provided when desired such as during downhill coasting. The actuation of the braking effect is not affected by the converter speed ratio.

Obviously, many modifications and variations of the present invention are possible in light of the above teachings. It is, therefore, to be understood that within the scope of the appended claims the invention may be practiced otherwise than as specifically described.

What is claimed is:

1. A torque converter comprising; an engine driven impeller; a turbine in fluid drive relation with said impeller; turbine shaft means drivingly connected to said turbine for delivering torque from said converter; stator means disposed in the fluid path between said turbine and said impeller for redirecting the fluid from said turbine to said impeller and brake means operatively connected with said stator for controlling the rotary speed of said stator, to permit rotation thereof in the direction opposite to said impeller at a controlled rate for limiting the torque delivery of said turbine and for controlling the torque absorption capacity of said torque converter when said turbine is driving said impeller.

2. A torque converter comprising; an engine driven impeller means for generating fluid power in said torque converter; a turbine output shaft; turbine means for receiving fluid power from said impeller and being drivingly connected with said turbine output shaft for delivering power thereto; stator means disposed between said impeller means and said turbine means for redirecting fluid flow therebetween to increase the torque ratio of the torque converter when the speed ratio of the torque converter is below a predetermined value; selectively operable brake means operatively connected to said stator means for controlling the rotation of said stator means to permit rotation thereof in a direction opposite to said impeller at a controlled rate to limit the torque ratio; and means for controlling said brake means to engage said brake means when the speed ratio in said torque converter is below the predetermined value and to release said brake means when the speed ratio is above the predetermined value.

3. A torque converter comprising; a throttle controlled engine driven impeller means for generating fluid power in said torque converter; a turbine output shaft; turbine means for receiving fluid power from said impeller and being drivingly connected with said turbine output shaft for delivering power thereto; stator means disposed between said impeller means and said turbine means for redirecting fluid flow therebetween to increase the torque ratio of the torque converter when the speed ratio of the torque converter is below a predetermined value; selectively operable friction brake means operatively connected to said stator means for controlling the rotation of said stator means to limit the torque ratio; and means for controlling said friction brake means to engage said brake means when the speed ratio in said torque converter is below the predetermined value and to release said brake means when the speed ratio is above the predetermined value, and for engaging said brake means when the engine throttle is closed for controlling said stator to establish churn braking in said torque converter when the turbine means is being driven by the turbine shaft.

4. A torque converter for a vehicle comprising; a throttle controlled engine driven impeller; a turbine in fluid drive relation with said impeller; a turbine shaft means drivingly connected to said turbine for delivering torque therefrom; a stator means disposed in the fluid path between said turbine and said impeller for redirecting the fluid from said turbine to said impeller; friction brake means operatively connected with said stator for controlling the rotary speed of stator relative to said impeller for limiting the torque delivery of said turbine and for controlling the torque absorption capacity of said torque converter when said turbine is driving said impeller; and control means having first valve means responsive to vehicle speed and engine throttle to control the engagement and disengagement of said friction brake means when the speed ratio of said torque converter is in a predetermined range, and second valve means responsive to the engine throttle to control the engagement of said brake means when the engine throttle is closed and the speed ratio of said torque converter is above the predetermined range.

* * * * *

UNITED STATES PATENT AND TRADEMARK OFFICE
CERTIFICATE OF CORRECTION

PATENT NO. : 3,901,030
DATED : August 26, 1975
INVENTOR(S) : Quinby E. Wonn

It is certified that error appears in the above–identified patent and that said Letters Patent are hereby corrected as shown below:

Abstract page, the patent issue date "August 29, 1975" should read -- August 26, 1975 --.

Signed and Sealed this twenty-fifth Day of November 1975

[SEAL]

Attest:

RUTH C. MASON
*Attesting Officer*

C. MARSHALL DANN
*Commissioner of Patents and Trademarks*